(12) United States Patent
König et al.

(10) Patent No.: US 7,957,320 B2
(45) Date of Patent: Jun. 7, 2011

(54) METHOD FOR CHANGING A GROUP KEY IN A GROUP OF NETWORK ELEMENTS IN A NETWORK SYSTEM

(75) Inventors: Hartmut König, Dresden (DE); Fuwen Liu, Cottbus (DE)

(73) Assignee: Brandenburgishe Technishe Universitat Cottbus, Cottbus (DE)

( * ) Notice: Subject to any disclaimer, the term of this patent is extended or adjusted under 35 U.S.C. 154(b) by 280 days.

(21) Appl. No.: 11/522,520

(22) Filed: Sep. 18, 2006

(65) Prior Publication Data
US 2007/0162750 A1    Jul. 12, 2007

(30) Foreign Application Priority Data
Dec. 1, 2005   (EP) .................................... 05026208

(51) Int. Cl.
*G01R 31/08* (2006.01)
(52) U.S. Cl. ...................................... 370/254; 713/171
(58) Field of Classification Search .................. None
See application file for complete search history.

(56) References Cited

U.S. PATENT DOCUMENTS

| | | | | |
|---|---|---|---|---|
| 6,049,878 | A * | 4/2000 | Caronni et al. | 726/3 |
| 6,785,809 | B1 * | 8/2004 | Hardjono | 713/163 |
| 6,941,457 | B1 * | 9/2005 | Gundavelli et al. | 713/163 |
| 7,234,063 | B1 * | 6/2007 | Baugher et al. | 713/189 |
| 7,269,728 | B1 * | 9/2007 | Li | 713/163 |
| 7,370,077 | B2 * | 5/2008 | Pradhan et al. | 709/204 |
| 7,383,436 | B2 * | 6/2008 | Srivastava et al. | 713/163 |

(Continued)

FOREIGN PATENT DOCUMENTS
EP    1 501 237 A    1/2005

OTHER PUBLICATIONS

Agarwal, D., "Totem: A Reliable Ordered Delivery Protocol for Interconnected Local-Area Networks", Aug. 1994, 166 pages, University of California, Santa Barbara.

(Continued)

*Primary Examiner* — Phirin Sam
(74) *Attorney, Agent, or Firm* — Smith Patent Office (57) ABSTRACT

The invention relates to a method for changing a group key GK for a secure data exchange in a group of network elements $P_1 \ldots P_n$ ($n=2, 3, \ldots$) in a network system having a closed peer-to-peer configuration and a virtual synchronism supporting group communication protocol in a communication layer of a system architecture of the network system, wherein in the case of a change in a composition of the group of network elements $P_1 \ldots P_n$, caused by the join of a new network element $P_{n+1}$ into the group of network elements $P_1 \ldots P_n$ or by the leave of a network element $P_v$ ($1 \leq v \leq n$) from the group of network elements $P_1 \ldots P_n$, a group key renewal, in which a network element $P_i^*$ ($1 \leq i \leq n$) selected from the group of network elements $P_1 \ldots P_n$ generates a new group key $GK_{neu}$, is carried out and the new group key $GK_{neu}$ is transferred from the selected network element $P_i$ to all the remaining network elements $P_k$ ($1 \leq k \leq n$, $k \neq i$) of the group of network elements $P_1 \ldots P_n$ in the changed composition, which the selected network element $P_i^*$ achieves by carrying out a key exchange with all the remaining network elements $P_k$ in accordance with the Diffie-Hellman principle in order to transfer the new group key $GK_{neu}$.

16 Claims, 4 Drawing Sheets

U.S. PATENT DOCUMENTS

| | | | | |
|---|---|---|---|---|
| 7,434,046 | B1* | 10/2008 | Srivastava | 713/163 |
| 2003/0233538 | A1* | 12/2003 | Dutertre | 713/151 |
| 2005/0021946 | A1* | 1/2005 | Narayanan | 713/163 |
| 2005/0058295 | A1* | 3/2005 | Kang | 380/282 |
| 2005/0152305 | A1* | 7/2005 | Ji et al. | 370/328 |
| 2005/0204161 | A1* | 9/2005 | Caronni | 713/201 |
| 2006/0168047 | A1* | 7/2006 | Li | 709/206 |
| 2007/0016663 | A1* | 1/2007 | Weis | 709/223 |
| 2007/0030817 | A1* | 2/2007 | Arunachalam et al. | 370/254 |
| 2007/0055870 | A1* | 3/2007 | Bruti et al. | 713/168 |
| 2008/0080537 | A1* | 4/2008 | Wan et al. | 370/401 |
| 2008/0165974 | A1* | 7/2008 | Inoue et al. | 380/279 |

OTHER PUBLICATIONS

Whetten, B. et al., "A High Performance Totally Ordered Multicast Protocol", In Theory and Practice in Distributed Systems, Sep. 1994, 20 pages, Computer Science 938, International Workshop.

Krawczyk, H. et al., "HMAC: Keyed-Hashing for Message Authentication", Feb. 1997, 11 pages.

Harkins, D. et al., "The Internet Key Exchange (IKE)", Nov. 1998, 41 pages.

Steiner, M. et al. "CLIQUES: A New Approach to Group Key Agreement", IEEE International Conference on Distributed Computing Systems, 1998, 8 pages.

Housley, R. et al., "Internet X. 509 Public Key Infrastructure Certificate and CRL Profile", http://www.process.com/techsupport/pmdf/rfc/rfc2459.html, Jan. 1999, 112 pages.

Rescorla E. et al., "Diffie-Hellman Key Agreement Method", http://www.apps.ietf.org/rfc/rfc2631.html, Jun. 1999, 12 pages.

Rodeh, O. et al., "Optimized Group Rekey for Group Communication Systems", In Symposium Network and Distributed System Security (NDSS), Feb. 2000, pp. 39-48, San Diego.

Wong, C. et al. "Secure Group Communications Using Key Graphs", IEEE/ACM Transactions on Networking, Feb. 2000, pp. 16-30, vol. 8, No. 1, IEEE.

Dondeti, L. et al., "A Distributed Group Key Management Scheme for Secure Many-to Many Communication", Proceedings of The Fifth IEEE Symposium on Computers and Communications, Jul. 2000, 9 pages, ISCC 2000.

Kim, Y. et al., "Simple and Fault-Tolerant Key Agreement for Dynamic Collaborative Groups", 7th ACM Conference on Computer and Communications Security, Nov. 2000, pp. 235-244, ACM Press, Athens, Greece.

"Information Technology—Open Systems Interconnection—The Directory: Public Key and Attribute Certificate Frameworks", May 3, 2001, 162 pages, ITU-T Recommendation X. 509, Draft ISO/IEC 9594-8.

Aiello, W. et al., "Just Fast Keying (JFK)", www3.ietf.org/proceedings/02jul/I-D/draft-ietf-ipesec-jfk-04.txt, Jul. 2002, 21 pages.

Kaufman, C., "Internet Key Exchange (IKEv2) Protocol <draft-ietf-ipsec-ikev2-07.txt>", http://tools.ietf.org/id/draft-ietf-ipsec-ikev2-07.txt, Apr. 2003, 91 pages.

Popovici, E. et al., "Consistency Support for A Decentralized Management in Close Multiparty Conferences Using SIP", The 11th IEEE International Conference on Networks (ICON 2003), 2003, pp. 295-300, IEEE Press, Sydney, Australia.

Dai, W., "Speed Comparison of Popular Crypto Algorithms", http://www.eskimo.com/~weidai/benchmarks.html, Jul. 2004, 6 pages.

Zuehlke, M. et al., "A Signaling Protocol For Small Closed Dynamic Multi-Peer Groups", High Speed Networks and Multimedia Communications (HSNMC 2004), 2004, pp. 973-984, Springer-Verlag, Berlin, Heidelberg, Germany.

Fuwen Liu et al., "Efficient Key Distribution for Closed Meetings in the Internet", International Conference for Communications and Multimedia Security; 9th IFIP-TC-6 TC-11, CMS 2005, Sep. 19-21, 2005, proceedings (lecture notes in computer science vol. 3677), Springer-Verlag Berlin, Germany, 2005, Seiten 271-272, XP002378847, ISBN: 3-540-28791-4.

S. Rafaeli, et al., "A Survey of Key Management for Secure Group Communication", ACM Computing Surveys, vol. 35, No. 3, Sep. 2003, pp. 309-329.

T. Ballardie, et al., "Core Based Trees (CBT): An Architecture for Scalable Inter-Domain Multicast Routing", Proceedings of ACM SIGCOMM'93 (1993), pp. 85-95.

H. Harney, et al., "Group Key Management Protocol (GKMP) Architecture", Jul. 1997, RFC 2094, 22 pages.

M. Burmester, et al., "A Secure and Efficient Conference Key Distribution System", Advances in Cryptology EUROCRYPT94, Springer LNCS vol. 950, 1995, pp. 275-286.

M. Steiner, et al., "Key Agreement in Dynamic Peer Groups", IEEE Transactions on Parallel and Distributed Systems, vol. 11, No. 8, Aug. 2000, pp. 769-780.

D. A. McGrew, et al., "Key Establishment in Large Dynamic Groups Using One-Way Function Trees", Technical Report, No. 0755, May, 1998, TIS Labs at Network Associates, Inc., Glenwood, MD., 13 pages.

M. J. Moyer, et al, "Maintaining Balanced Key Trees for Secure Multicast", Technical Report, IETF, Jun. 1999, draft-irtf-smug-key-tree-balance-00.txt., 1 page.

Y. Kim, et al., "Tree-based Group Key Agreement", ACM Transactions on Information and System Security (TISSEC) 7(2004) 1, 32 pages.

M. Steiner, et al., "Cliques: A New Approach to Group Key Agreement", IEEE ICDCS, 1998, 8 pages.

G. Ateniese, et al., "New Multiparty Authentication Services and Key Agreement Protocols", IEEE Journal Selected Areas in Communications, vol. 18, No. 4, Apr. 2000, 13 pages.

O. Pereira, et al., "A Security Analysis of the Cliques Protocols Suites", Proceedings of the 16th International Conference on Information Security: Trusted information:the new decade challenge. Paris, France, 2001, 9 pages.

S. Mittra, "Iolus: A Framework for Scalable Secure Multicasting", In Proceedings of the ACM SIGCOMM, Cannes, France, Sep. 1997, 12 pages.

* cited by examiner

METHOD FOR CHANGING A GROUP KEY IN A GROUP OF NETWORK ELEMENTS IN A NETWORK SYSTEM

The invention relates to a method for changing a group key in a group of network elements in a network system.

BACKGROUND OF THE INVENTION

Modern group oriented and collaborative applications for data exchange between network elements of a group of network elements in a network system make increased use of the peer-to-peer principle. Compared to centralized approaches of the client-server configuration, this offers the advantage of a greater independence from a possibly costly infrastructure, as is the case, for example, for audio and video conferences with H.32x systems. Decentralized systems have proven to be more flexible here, since there is no Single Point of Failure and the dependence from an infrastructure is reduced. Decentralized solutions support in particular the spontaneous data exchange and the mobility of the users of the network elements. This is advantageous, for example, for business communication over the Internet.

However, decentralized configurations require mechanisms to assure the confidentiality of the exchanged data. This requires, in particular, methods for exchanging keys, which are used for decrypting/encrypting the exchanged data, where the key exchange method must ensure consistent key renewal for all network elements engaged in a group of network elements. While there are viable solutions for centralized approaches, the development of efficient and secure methods for distributed configurations is the object of intense research.

Secure data exchange within a group of network elements requires that only actively participating network elements dispose of a current group key or session key for the encryption/decryption of the exchanged data parts. In the case of a varying group composition, that is, the joining of a further network element into the group, or if a network element leaves the group, it can additionally be desirable and necessary for the content and subject matter of a session between users of the network elements to be inaccessible to entering users who join the session later or leave it earlier. This complex variant of a confidential session is examined in the following text. Variants having lower confidentiality demands on a varying composition of a group of network elements can be derived therefrom.

A range of different demands is made on a key management in such a group of network elements. (1) Each network element of the group must ensure that nobody outside the group can obtain access to the group key ("key authentication"). Prerequisite for this is a mutual authentication of each network element when the network element joins the group, which assures that the joining network element is also the network element expected by the group of network elements, and which, conversely, provides the joining network element and its user, respectively, the assurance that he can trust the group. (2) A network element leaving the session at any point in time shall not obtain access to a subsequently generated key for the exchange of data between the network elements in order to decrypt the subsequent communication ("forward confidentiality"). (3) Network elements, which join the group later, shall not obtain access to a previously used key in order to disclose data, which were exchanged prior to joining between the network elements of the group. (4) None of the network elements leaving the group of network elements shall be capable of utilizing older keys to derive a currently used key ("collusion freedom").

It is furthermore desirable for a key compromising not to lead to the uncovering of previous keys ("perfect forward secrecy") and for the uncovering of keys from previous sessions not to lead to the compromising of the current key ("resistance to known key attacks"). The demand for an efficient exchange protocol for the keys, which would minimize interference periods in the data exchange for key renewal, in particular for real-time applications such as audio and video conferences, seems almost obvious, since in the asynchronous Internet, hosts are generally not capable of renewing the keys in a synchronous manner.

Two types of key exchange protocols in groups of network elements are distinguished in principle, namely the key agreement protocols and the key distribution protocols. Both types of protocols differ by the type of key renewal, that is, with respect to the method by which a previously used key is replaced by a new key for the encryption/decryption of the exchanged data.

Key agreement protocols are based on the Diffie-Hellman key exchange principle (cf. E. Rescorla: Diffie-Hellman Key Agreement Method. RFC 2631, June 1999). The basic principle is that every network element of the group of network elements is required to contribute to the generation of the key. For this, a network element is selected from the group of network elements, which generates an intermediate key, which is then distributed to the remaining members of the group of network elements. The remaining network elements subsequently generate a group key from the intermediate keys and from their own contribution. Known examples for this type of key exchange protocols are CLIQUES (cf. M. Steiner et al.: CLIQUES: A new approach to group key agreement. IEEE International Conference on Distributed Computing Systems, 1998, pp. 380-397) and TGDH (cf. Y. Kim et al.: Simple and fault-tolerant key agreement for dynamic collaborative groups. In S. Jajodia (ed.): 7th ACM Conference on Computer and Communications Security, Athens, Greece, November 2000, ACM Press, pp. 235-244). The latter is currently regarded as very efficient key agreement protocol.

In contrast to this, key distribution protocols dynamically define one of the network elements, which generates the new key and distributes it securely to the remaining network elements of the group. Most approaches use a key distribution tree. They are distinguished by the way in which the network elements of the group obtain the key through the key distribution tree. Examples for such key distribution protocols are DTKM (cf. L. Dondeti et al.: Disec: A distributed framework for scalable secure many-to-many communication, Proceedings of The Fifth IEEE Symposium on Computers and Communications (ISCC 2000), July 2000) and a distribution tree proposed by Rodeh et al. (cf. O. Rodeh et al.: Optimized Group Rekey for Group Communications Systems. In Symposium Network and Distributed System Security (NDSS), San Diego, Calif., February 2000, pp. 39-48), which is an extension of a centralized logical key hierarchy (cf. C. Wong et al.: Secure group communication using key graphs, IEEE/ACM Transaction on Networking 8 (1) 16-30, 2000).

Key distribution protocols are regarded as more efficient, since, overall, they require a smaller computational and communication expenditure for the generation and distribution of the key.

SUMMARY OF THE INVENTION

It is the object of the invention to provide a method for changing a group key in a group of network elements in a network system having a closed peer-to-peer configuration, in which an efficient and reliable generation and distribution of keys is ensured, which are usable for encrypting/decrypting the data exchanged in the group.

According to the invention, this object is solved by a method according to the independent Claim 1. Advantageous embodiments of the invention are within the scope of dependent subclaims.

According to the invention, there is provided a method for changing a group key GK for a secure data exchange in a group of network elements $P_1 \ldots P_n$ (n=2, 3, ...) in a network system having a closed peer-to-peer configuration and a virtual synchronism supporting group communication protocol in a communication layer of a system architecture of the network system, wherein in the case of a change in a composition of the group of network elements $P_1 \ldots P_n$, caused by the joining of a new network element $P_{n+1}$ into the group of network elements $P_1 \ldots P_n$ or by the leaving of a network element $P_v(1 \leq v \leq n)$ from the group of network elements $P_1 \ldots P_n$, a group key renewal is carried out, in which a network element $P_i^*$ ($1 \leq i \leq n$) selected from the group of network elements $P_1 \ldots P_n$ generates a new group key $GK_{neu}$ and the new group key $GK_{neu}$ is transferred from the selected network element $P_i$ to all the remaining network elements $P_k(1 \leq k \leq n, k \neq i)$ of the group of network elements $P_1 \ldots P_n$ in the changed composition, which the selected network element $P_i^*$ achieves by carrying out a key exchange with all the remaining network elements $P_k$ in accordance with the Diffie-Hellman principle, in order to transfer the new group key $GK_{neu}$.

With the help of the proposed method, when the composition of the group of network elements changes, a new group key for encrypting data to be exchanged is generated in a secure and at the same time efficient manner and is subsequently distributed among the remaining members of the group of network elements. On the one hand, the method ensures a high security standard by meeting the initially described security requirements, and, on the other hand, it minimizes the computational expenditure during the group key renewal.

A preferred embodiment of the invention provides that, in order to determine the selected network element $P_i^*$ during the group key renewal, a virtual token is assigned to a network element $P_i(1 \leq i \leq n)$ from the group of network elements $P_1 \ldots P_n$ with the use of a token protocol, with the network element $P_i$ thus becoming a token holder PT. The use of a virtual token avoids explicit token forwarding and all the problems associated therewith, such as token loss and token duplication.

An advantageous embodiment of the invention provides that, in order to determine the selected network element $P_i^*$ during the group key renewal, a physical token is assigned to a network element $P_i(1 \leq i \leq n)$ from the group of network elements $P_1 \ldots P_n$ with the use of a token protocol, with the network element $P_i$ thus becoming a token holder PT.

In an expedient embodiment of the invention, for further group key renewals, the token assignment is carried out again in each case, thereby further increasing the security standard.

In an advantageous further development of the invention, when using the virtual token, the token holder PT is determined from a group of network elements $P_1 \ldots P_n$ according to the following relation:

PT=VK mod n, wherein VK indicates a numerical value for a version number of the new group key $GK_{neu}$ generated during the group key renewal and is increased by the value of 1 in each group key renewal.

In a purposeful further development of the invention, it is provided that the group key renewal is carried out using the modified IKEv2 protocol (IKEv2—"Internet Key Exchange Protocol"). In this way, the identity of the network elements participating in the group is protected.

In a preferred embodiment of the invention, it can be provided that, when the new network element $P_{n+1}$ joins the group of network elements $P_1 \ldots P_n$, the new group key $GK_{neu}$ is transferred during key exchange according to the Diffie-Hellman principle by means of a message having the following structure:

$M_{j5}(P_i \to P_1, P_2 \ldots P_{n+1}):HDR, GK_{alt}\{ID_i N_i\},$
$K_{i1}\{VK_{alt}GK_{neu}\}, \ldots, K_{in}\{VK_{alt}GK_{neu}\},$
$SK\{GK_{neu}VK_{neu}GSA,ID_i\}GK_{neu}\{g^{m+1}ID_{n+1}\}$ wherein a first message part $GK_{alt}\{ID_i, N_i\}$, which is encrypted with an old group key $GK_{alt}$ used prior to the new group key, comprises an identity $ID_i$ of the token holder PT and a random number N; wherein a second message part $K_{i1}\{VK_{alt}GK_{neu}\}, \ldots, K_{in}\{VK_{alt}GK_{neu}\}$ comprises the new group key $GK_{neu}$ and a numerical value for the version number $VK_{alt}$ of the old group key $GK_{alt}$; wherein a third message part $SK\{GK_{neu}, VK_{neu}, GSA, ID_i\}$, which is encrypted with a session key SK, transfers the new group key $GK_{neu}$, a numerical value for the version number $VK_{neu}$ Of the new group key $GK_{neu}$, a security association GSA of the group of network elements $P_1 \ldots P_n$ and the identity $ID_i$ of the token holder PT to the new network element $P_{n+1}$ joining the group of network elements $P_1 \ldots P_n$; and wherein a fourth message part $GK_{neu}\{g^{m+1}, ID_{n+1}\}$, which is encrypted with the new group key $GK_{neu}$, comprises an identity $ID_{n+1}$ and a public Diffie-Hellman value $g^{m+1}$ of the new network element $P_{n+1}$ joining the group of network elements $P_1 \ldots P_n$.

In order to improve the confidentiality among the users of the network elements, an advantageous embodiment of the invention provides that when the new network element $P_{n+1}$ joins the group of network elements $P_1 \ldots P_n$, an authentication of the new network element $P_{n+1}$ is carried out prior to the group key renewal. The authentication of the new network element $P_{n+1}$ is carried out preferably by the selected network element $P_i^*$. In an embodiment of the invention, the authentication of the new network element $P_{n+1}$ is purposefully carried out by means of digital signature.

Preferably, according to an embodiment of the invention, in the case of a successful authentication, the selected network element $P_i^*$ transfers a respective public Diffie-Hellman value $g^i$ ($1 \leq i \leq n$) to the new network element $P_{n+1}$ for all the remaining network elements $P_k$ of the group of network elements $P_1 \ldots P_n$, and the new network element $P_{n+1}$ transfers its public Diffie-Hellman value $g^{n+1}$ to the selected network element $P_i^*$, which itself transfers the public Diffie-Hellman value $g^{n+1}$ of the new network element $P_{n+1}$ to all the remaining network elements $P_k$ of the group of network elements $P_1 \ldots P_n$.

In an advantageous further development of the invention, it is provided that the authentication of the new network element $P_{n+1}$ is carried out using the modified IKEv2 protocol.

A preferred further development of the invention can provide that the following messages are exchanged between the new network element $P_{n+1}$ and the selected network element $P_i^*$ during the authentication of the new network element $P_{n+1}$ by the selected network element $P_i^*$:

$M_{j1}(P_i \to P_{n+1}):HDR, d^i, SA_i, NA_i$ $M_{j2}(P_{n+1} \to P_i):HDR, d^{m+1}, SA_{n+1}, NA_{n+1}$ $M_{j3}(P_i \to P_{n+1}):HDR, SK\{ID_i, CERT_i, SIG_i, ID_1, ID_2 \ldots ID_n, g^{r1}, g^{r2} \ldots g^{rn}\}$ $$M_{J4}(P_{n+1} \to P_i): HDR, SK\{ID_{n+1}, CERT_{n+1}, SIG_{n+1}, g^{rn+1}\}$$

wherein HDR are head data, CERT is a certificate of a public RSA key, SIG is the digital signature, $g^r$ is a public Diffie-Hellman value for generating a temporary and secure transfer channel K and $d^r$ is a public value for generating a session key SK;

wherein SK{M} indicates an encryption of the message M using an encryption key $SK_e$ and an authentication using an authentication key $SK_a$; and wherein a security association SA is negotiated with the messages $M_{J1}$ and $M_{J2}$.

A further development of the invention purposefully provides for a group key renewal to be carried out analogously to the joining of the new network element $P_{n+1}$ when a network element $P_v$ leaves the group of network elements $P_1 \ldots P_n$.

According to a preferred further development of the invention, upon leaving of the network element $P_v$, all the remaining network elements $P_x$ ($1 \leq x \leq n$, $x \neq v$) of the group of network elements $P_1 \ldots P_n$ in the changed composition delete in each case a public Diffie-Hellman value $g^v$ of the network element $P_v$ leaving the group of network elements $P_1 \ldots P_n$.

According to an embodiment of the invention, the new group key $GK_{neu}$ is used in data communication between the several network elements $P_i$ in the network system for exchanging video and/or audio and/or text data.

DESCRIPTION OF PREFERRED EXEMPLARY EMBODIMENTS OF THE INVENTION

The invention will now be described by way of exemplary embodiments with reference to a drawing, where.

A method for changing a group key in a group of network elements $P_1 \ldots P_n$ (n=2, 3, ...) in a network system having a closed peer-to-peer configuration is explained in the following making reference to FIGS. 1 to 6. In particular, a distribution method is hereby explained in connection with the renewal and following distribution of a key for encrypting/decrypting the data exchanged in the group. For reasons of simplification, the method for key distribution is partly designated with the abbreviation VTKD ("virtual token based key distribution"). A physical token is used in an alternative embodiment, for, which reason the abbreviation TKD ("token based key distribution") is useful.

Figure 1:
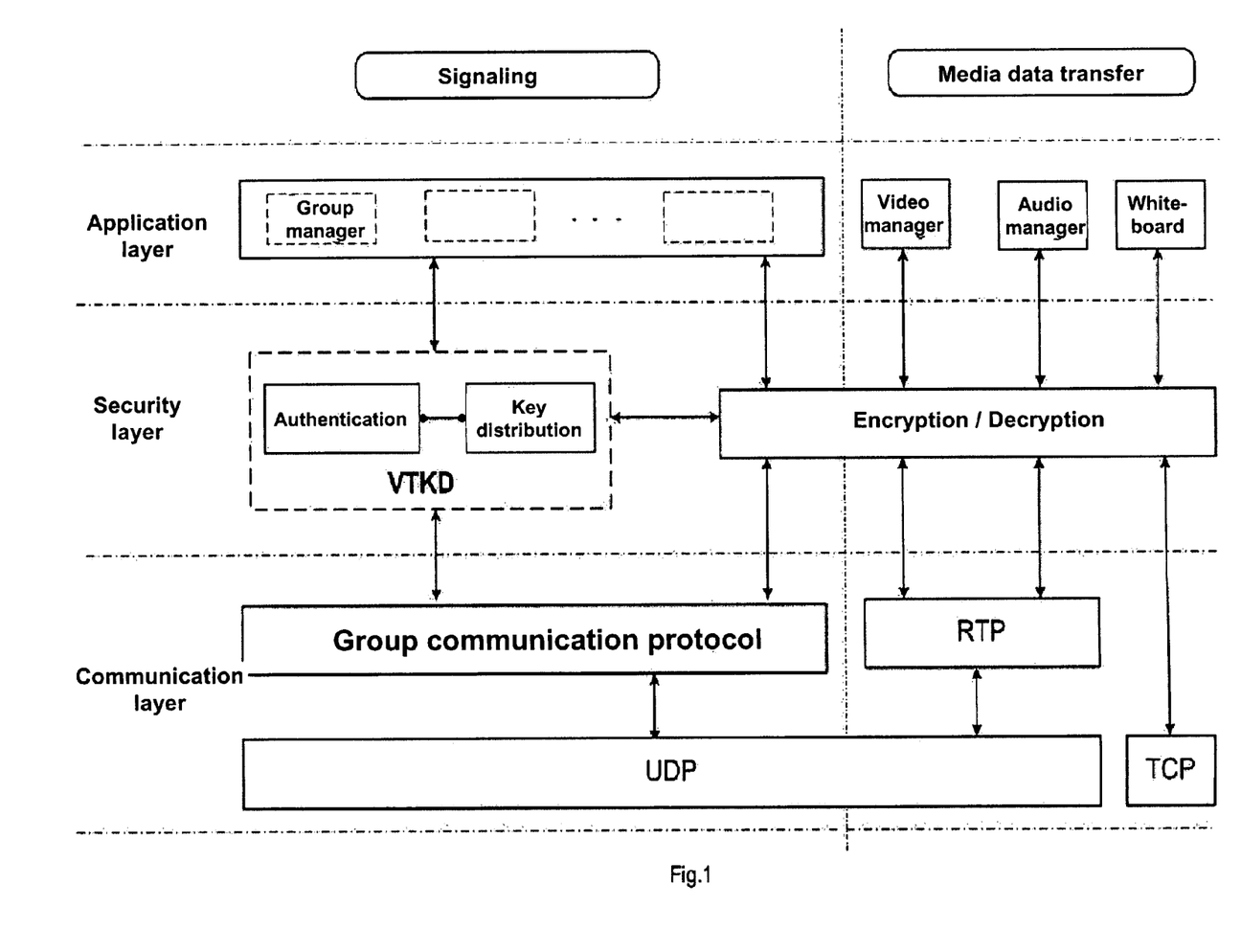
FIG. 1 is a schematic representation of a system architecture of a network system.

FIG. 1 shows a schematic representation of a system architecture, which forms the basis for the following description. The three-layered architecture comprises a user layer 1, a security layer 2 and a communications layer 3. A key distribution protocol 4 is assigned to the security layer 2 and runs in a signaling part. With the help of a group key, both media data and signaling data can be encrypted.

The application layer 1 comprises components required for a respective application. In the case of a video conference application, these are in particular a QoS management (QoS—"Quality of Service"), a floor control, an audio manager 6, a video manager 5 and a whiteboard 4. An essential component is a group management 8, for, which it is assumed in the following text that it is also integrated in the application layer 1. The group management 8 obtains requests for joining or leaving the group of network elements via a user interface, which are forwarded by the user interface to the network elements of the group via a group communication protocol 9. The failure of a network element from the group of network elements is identified by means of the group communication protocol 9 and brought to the attention of the other network elements.

The security layer 2 comprises encryption modules 10, an authentication module 11 as well as the key distribution protocol 4, which is described in more detail in the following text. A key renewal is triggered whenever the composition of the group changes, that is, a new network element joins the group, a network element leaves the group of network elements or a network element is lost. In VTKD, the joining of the group of network elements is associated with a mutual authentication between the new network element and the network element handling the joining, in order to ensure that both sides can trust one another.

The communication layer 3 comprises protocols for a transfer of the signaling data and the media data. Only the group communication protocol 9, which forms an important basis, is relevant for the key renewal. In collaborative peer-to-peer applications, the group communication protocol provides the basis for a reliable operation of the system or of the application. It has to actualize group data in all peers and ensure that all peers have a consistent view over the group so that these are able to independently make decisions on the QoS parameter settings, the floor allocation and the renewal of the group key. For this, the group communication protocol 9 must ensure a virtual synchronization between the group members. Virtual synchronization means that all group members obtain reliably the exchanged messages in the order in which they were sent. This requires for the group communication protocol 9 to be reliable, ordered and atomic, in order to avoid data losses, ensure a transmission sequence and ensure consistent actualization of the group data. Virtual synchronization requires the group communication protocol 9 to indicate to all the members all the changes in the group composition, such as joining, leaving or failing. Protocols are known, which support virtual synchronization, such as RMP (cf. B. Whetten et al.: A High Performance Totally Ordered Multicast Protocol. In Theory and Practice in Distributed Systems, International Workshop, Lecture Notes in Computer Science 938, September 1994, pp. 33-57), the Totem protocol (cf. D. A. Agarwal: Totem: A Reliable Ordered Delivery Protocol for Interconnected Local Area Networks, Ph.D. Thesis, University of Santa Barbara, December 1994) and GCP (cf. E. C. Popovici et al.: Consistency Support for a Decentralized Management in Closed Multiparty Conferences Using SIP, Proc. of the 11th IEEE International Conference on Networks (ICON 2003), Sydney, Australia, IEEE Press, 2003, pp. 295-300; M. Zuehlke et al.: A Signaling Protocol for Small Closed Dynamic Multi-peer Groups, in Z. Mammeri et al. (eds.): High Speed Networks and Multimedia Communications (HSNMC 2004), Springer-Verlag, Berlin, Heidelberg 2004, pp. 973-984).

A distributed key management requires a virtual synchronization for the group communication protocol 9 used, that is, there is a close relationship between these two protocols.

When this property is not met, it can lead to confusion during key renewal as a result of the different view on the group of network elements, since it is possible that several network elements of the group are designated for the key renewal. For this reason, it is hereinafter assumed that the property of virtual synchronization is given for the group communication protocol 9.

In the method proposed herein for the secure exchange of data in the closed peer-to-peer configuration, the key exchange during a key renewal is based on the principle according to Diffie-Hellman (DH) (cf. E. Rescorla: Diffie-Hellman Key Agreement Method. RFC 2631, June 1999) so that there is no central key management. In contrast to the key exchange between two network elements of the group, in the distributed approach, each network element of the group calculates with every other network element a secret key according to the Diffie-Hellman principle. This secret key is hereinafter referred to as shared or bilateral DH secret.

The bilateral DH secrets are stored with the members of the group of network elements and subsequently used for distributing the group key. With regard to the members of the group of network elements, it is assumed that they have the same rights and that they are shown the same trust. This means that each network element of the group of network elements may authenticate a new joining network element and renew the group key. It is further assumed that a new network element joining the group of network elements is trustworthy and does not actively attempt to disturb the ongoing data exchange or forward the session key to network elements who are not members of the group. However, no assumptions are made regarding the trustworthiness of the network elements subsequent to leaving the group of network elements. These assumptions are consistent with operating practice and are usually met.

VTKD makes use of a token protocol. Only a token holder has the right to renew the group key and to authenticate a joining new network element in each case. Instead of using a physical token, which is forwarded within a logical ring of the network elements of the group, VTKD uses a virtual token. In this context, virtual means that the position of the virtual token, and therefore of the token holder, is calculated again for each key distribution. As a result, the explicit forwarding of a token and all the problems associated therewith, such as token loss and token duplication, are avoided. The new token position PT is calculated as follows:

$$PT = VK \bmod n. \tag{1}$$

where VK is a numerical value for a respective version number of the group key and n is the current number of network elements of the group of network elements $P_1 \ldots P_n$. VK is increased by the value 1 with each renewal of the group key. The value for the version number is also used in the protocol to avoid replay attacks. This is explained in more detail later in the text.

The assurance of a virtual synchronization by means of the group communication protocol ensures that each network element of the group of network elements knows a current group size and the version of the key. In this way, each member of the group of network elements can unambiguously determine the position of the virtual token.

Any change in the composition of the group of network elements triggers a key renewal procedure. The token holder generates a new key and begins with its distribution to the remaining members of the group of network elements. To achieve this, the token holder builds temporary, separate transfer channels to each member of the group of network elements by using the stored shared DH secret in each case.

Figure 2:
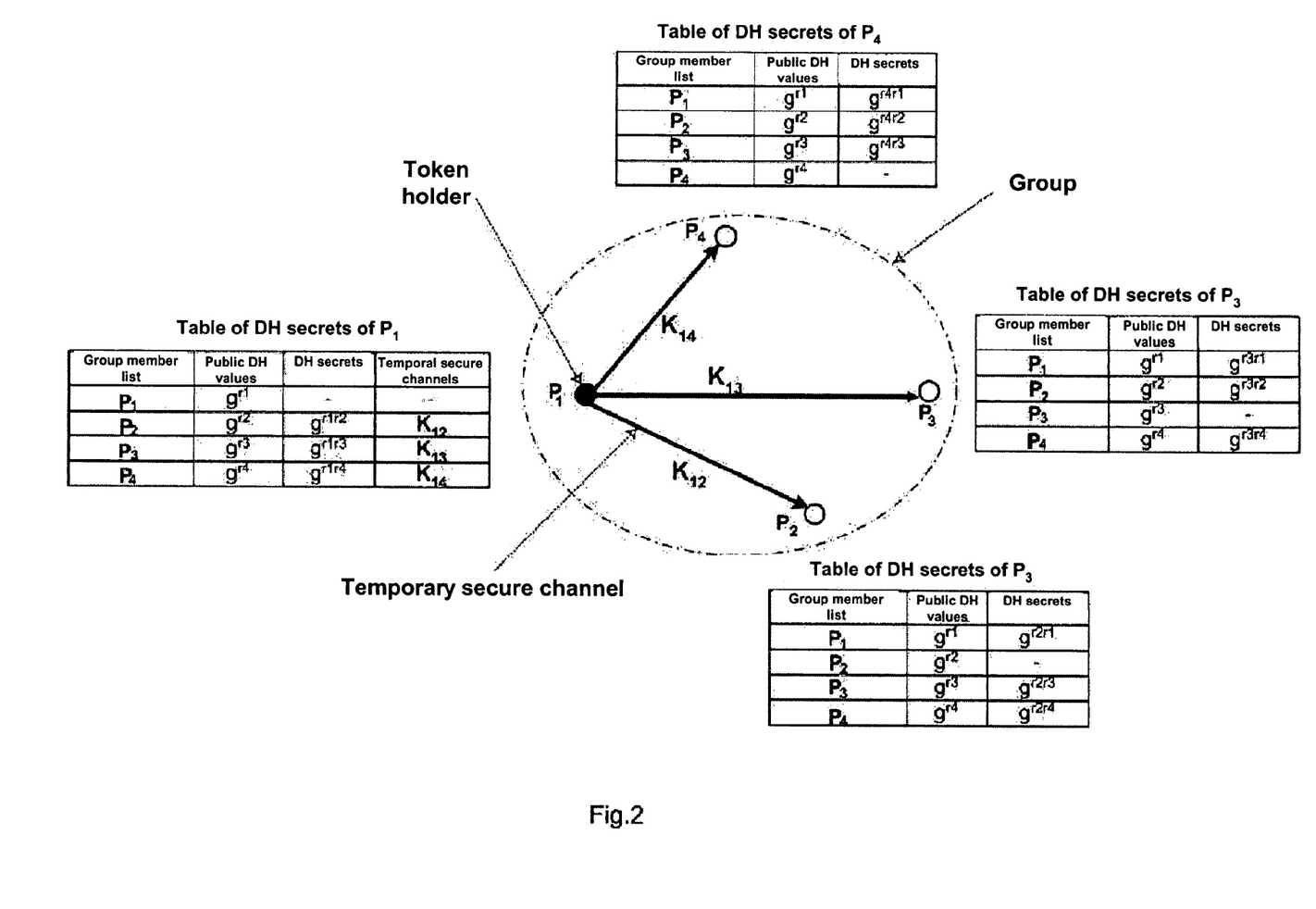
FIG. 2 is a schematic representation for explaining a method in the context of a key renewal.

FIG. 2 shows a schematic representation for a group of four network elements $P_1$, $P_2$, $P_3$, $P_4$, with $P_1$ being the current token holder. Each member of the group of network elements knows its DH secret with each other network element. Thus, $P_1$ stores the DH secrets $g^{r1r2}$, $g^{r1r3}$ and $g^{r1r4}$. $P_2$ stores the DH secrets $g^{r2r1}$, $g^{r2r3}$ and $g^{r2r4}$. Using the shared DH secrets $g^{r1r2}$, $g^{r1r3}$, $g^{r1r4}$ $P_1$ then builds up secret channels $K_{12}$, $K_{13}$, $K_{14}$ to $P_2$, $P_3$ and $P_4$, through, which the new group key is then distributed. The separate secret transfer channels are defined by means of a secret key $K_{ij}$, which is calculated between the two network elements $P_i$, $P_j$. The following calculation scheme is hereby used:

$$K_{ij-e} = H(g^{rij i}, g^{ri rj}|N_i|ID_i|ID_j|0) \tag{2}$$

$$K_{ij-a} = H(g^{rij i}, g^{ri rj}|N_i|ID_i|ID_j|1) (j=1,2,\ldots n \text{ and } j \neq i) \tag{3}$$

A key pair is calculated. $K_{ij-e}$ is used for encrypting a message, while $K_{ij-a}$ serves for checking the authenticity of the messages. The generation of the key takes place with the help of a cryptographic hash function H(k,M), where k denotes a key and M denotes the message. HMAC (cf. H. Krawczyk et al.: HMAC: Keyed-Hashing for Message Authentication, RFC 2104, February 1997) is preferably used. The calculation includes the shared DH secret between the token holder and the network element of the group, their identities ID and a random number N, which the token holder sends to the network elements, which is described in more detail below. The symbol "|" denotes a concatenation.

Each member of the group of network elements respectively disposes of the shared DH secrets with the other members of the group of network elements according to the current group composition. This is ensured by the respective deletion from their table of a corresponding DH secret by the remaining network elements, every time a network element leaves the group of network elements. In the case of a new network element joining the group of network elements, the token holder sends all public DH values of the network elements of the group of network elements to the new network element during the authentication phase. Conversely, the new network element passes its public DH value to the token holder, who subsequently forwards it to the remaining members of the group of network elements. Each member of the group of network elements then calculates the shared DH secret with the new network element. In this way, the new network element is given the ability to carry out key renewal and key distribution as well, if he has the virtual token assigned to him.

Joining of a New Network Element ("Join Procedure")

The joining of the group of network elements comprises two steps: (i) an authentication and (ii) a renewal of a session key, which is required due to the change in the composition of the group of network elements.

Figure 3:
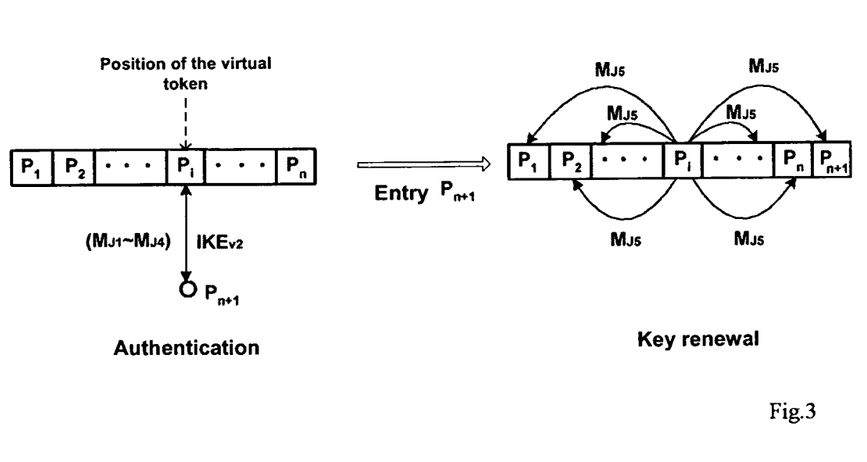
FIG. 3 is a schematic representation for explaining a joining of a group of network elements by a new network element.

FIG. 3 shows a schematic representation of the process of joining of a new network element. Five messages or communication rounds are required, in particular four for the authentication and one for the key renewal.

Any protocol for instance authentication can be used for a mutual authentication between the token holder and the joining new network element, for example the X.509 authentication procedure (cf. ITU-T Recommendation X.509 | ISO/IEC 9594-8: Public Key and Attribute Certificate Frameworks), IKE (cf. D. Harkins et al.: The Internet Key Exchange (IKE), RFC2409, November 1998) or JFK (cf. W. Aiello et al.: Just Fast Keying (JFK). draft-ietf-ipsec-jfk-04.txt. July 2002). In the following exemplary embodiment, IKEv2 ("Internet Key Exchange Protocol") (cf. C. Kaufman: Internet Key Exchange (IKEv2) Protocol, draft-ietf-ipsec-ikev2-07.txt, April 2003), which, in contrast to most other protocols, protects the identity of the network elements participating in the authentication, is used. We employ the modified IKEv2 here for mutual authentication. This is achieved by modifying soem message components of the IKEv2 protocol to adapt the group communication scenario.

IKEv2 supports two types of authentication. Digital signatures and previously agreed shared secrets. Digital signatures, which are better suited for peer-to-peer configurations than shared secrets, which support client/server architectures will be subsequently used.

In the case of digital signatures, the successful authentication depends on the authenticity of a public key. This is mostly verified by means of the use of certificates. For example, the X.509 certificate (cf. R. Housley et al.: Internet X.509 Public Key Infrastructure Certificate and CRL Profile. RFC 2459, January 1999) is often used at present. The use of a RSA signature is recommended. For this, both partners must possess a RSA key pair. It is understood that the public key from a certified authority is required for both partners, to be able to check the certificates signed by the certified authority.

FIG. 3 shows the entry of a new partner $P_{n+1}$ into a group of network elements $P_1 \ldots P_n$ comprising n members. It is assumed that the network element $P_i$ is the current token holder, who was determined according to formula (1). The modified IKEv2 protocol is used for the mutual authentication between $P_i$ and $P_{n+1}$, which consists of the following messages exchanged between them, where HDR denotes the message head:

$$M_{j1}(P_i \to P_{n+1}): HDR, a^{ri}, SA_i, NA_i$$

$$M_{j2}(P_{n+1} \to P_i): HDR, a^{rn+1}, SA_{n+1}, NA_{n+1}$$

$$M_{j3}(P_i \to P_{n+1}): HDR, SK\{ID_i, CERT_i, SIG_i, ID_1, ID_2 \ldots ID_n, g^{r1}, g^{r2} \ldots g^{rn}\}$$

$$M_{j4}(P_{n+1} \to P_i): HDR, SK\{ID_{n+1}, CERT_{n+1}, SIG_{n+1}, g^{rn+1}\}$$

In the above expressions, CERT represents the certificate of the public RSA key and SIG the digital signature. SK{M} means that the message M is encrypted under a distribution key $SK_e$ and authenticated under an authentication key $SK_a$. $g^r$ is the public DH value for generating the temporary and secure channel K. $a^r$ is the public DH value for generating a session key SK. The way in which the digital signature SIG and the session key SK are generated is explained in detail in the standard IKEv2 (cf. C. Kaufman: Internet Key Exchange (IKEv2) Protocol, draft-ietf-ipsec-ikev2-07.txt, April 2003) and therefore requires no further explanation here.

The messages $M_{j1}$ and $M_{j2}$ fulfill two functions. On the one hand, they are used for negotiating a security association SA. The security association SA specifies cryptographic parameters, which are used in the messages $M_{j3}$ and $M_{j4}$. Furthermore, the public DH values $a^r$ and the random numbers NA of both partners are exchanged together with the messages $M_{j1}$ and $M_{j2}$. These are used for generating the session key SK, which is used for protecting the following messages $M_{j3}$ and $M_{j4}$.

The messages $M_{j3}$ and $M_{j4}$ are used for reciprocal authentication of the partners and for negotiating the security associations, which are utilized for the further communication between the two partners. The authentication of the partners takes place by means of mutual verification of the signatures SIG. For this, both peers sign the concatenation of their first messages having the random number of the partner with their private RSA key. At the same time, this excludes possible man-in-the-middle attacks, since the attacker is not able to change the signatures without knowing the private RSA keys of both partners.

The principle of negotiation of the security association can not be adopted without changes for the method proposed here, because IKEv2 is a bilateral relationship. In VTKD, $M_{j3}$ and $M_{j4}$ additionally exchange group information. The message $M_{j3}$ transports the identities of all the group members $(ID_1, ID_2, \ldots ID_n)$ and their associated public DH values $(g^{r1}, g^{r2}, \ldots g^m)$. With $M_{j4}$, the invited partner returns his identity $ID_{n+1}$ and his public DH value $g^{m+1}$.

If the authentication is not successful, the token holder informs the group of network elements by way of the message $M_{ij}^*$:

$$M_{ij}(P_i \to P_1, P_2 \ldots P_n): HDR, GK_{alt}\{ID_{n+1}\}$$

The joining process is aborted. The group can continue to use the same session key.

Renewal of the Group Key

In the case of a successful authentication, the network element $P_i$ renews the group key. The new group key $GK_{neu}$ is generated randomly and is independent of the preceding ones. The token holder sends the new group key having the multicast message $M_{j5}$ to the extended group. The transfer channels described above are used for the exchange of $M_{j5}$. $M_{j5}$ has the following structure:

$$M_{j5}(P_i \to P_1, P_2 \ldots P_{n+1}): HDR, GK_{alt}\{ID_i, N_i\},$$
$$K_{i1}\{VK_{alt}, GK_{neu}\}, \ldots, K_{in}\{VK_{alt}, GK_{neu}\},$$
$$SK\{GK_{neu}, VK_{neu}, GSA, ID_i\}, GK_{neu}\{g^{m+1}, ID_{n+1}\}$$

The message has four parts having different objectives. A first part $GK_{alt}\{ID_i, N_i\}$ contains the identity of the token holder $ID_i$ and a random number N and is encrypted with the old group key $GK_{alt}$. Both elements are used to build up the secure channel in accordance with formula (2) and (3).

A second message part $K_{i1}\{VK, GK_{new}\}, \ldots, K_{in}\{VK, GK_{new}\}$, contains the new group key $GK_{neu}$ and a numerical value for a current version number VK. Both elements are encrypted separately for each group member with the help of the respective key of the secret transfer channel K# (j=1, 2, \ldots, n mit j≠i). Upon receipt, the network element calculates the current key of its channel with the help of the information from the first message part and decrypts its part.

A third message part $SK\{GK_{neu}, VK, GSA, ID_i\}$ transfers the group key $GK_{neu}$ and its version number VK to the new network element. A security association of the group GSA and the ID of the token holder are also transferred in order that the new network element identifies the token holder as sender. This message part is encrypted with the session key SK agreed upon during the authentication phase.

A fourth message part $GK_{neu}$ ($g^{m+1}$, $ID_{n+1}$) which is encrypted with the new group key $GK_{new}$, contains the identity of the new network element $ID_{n+1}$ and its public DH value $g^{m+1}$. Subsequent to decrypting the fourth message part and calculating the bilateral DH secret with the new network element, all the group members have the same information at their disposal again, i.e., they are able to renew the group key in the described way when the virtual token is allocated.

Leaving of a Network Element ("Leave Procedure")

Figure 4:
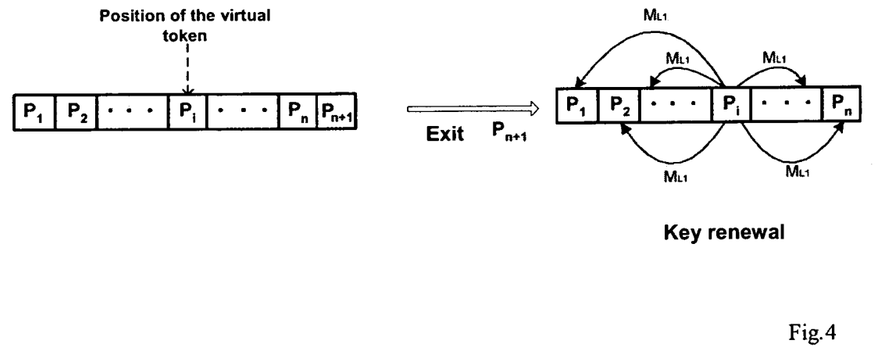
FIG. 4 is a schematic representation for explaining a procedure taking place when a network element leaves the group of network elements.

When a network element leaves the group of network elements, the group management informs the remaining group members about this. The group members determine the new token holder according to Formula (1), and the latter starts the renewal of the group key. FIG. 4 shows an example for this.

It is assumed that the network element $P_{n+1}$ leaves a group of n+1 network elements. Let $P_i$ be the token holder again.

The key renewal begins again with the token holder generating a new group key $GK_{neu}$ and sending it per multicast with the message $M_{L1}$ to the remaining group members. $M_{L1}$ has a similar structure to the joining message $M_{j5}$:

$$M_{L1}(P_i \rightarrow P_1, P_2 \ldots P_n): HDR, GK_{alt}\{ID_i, N_i\}, K_{i1}\{VK, GK_{neu}\}, \ldots, K_{in}\{VK, GK_{neu}\}$$

The message $M_{j5}$ first contains again the identity of the token holder and a random number for the renewal of the key $K_{ij}$ (j=1, 2, ..., n with j≠i) for the separate secret channels according to the relations (2) and (3). Both elements are encrypted with the old group key. The new group key $GK_{neu}$ and the current key version VK are encrypted with the key of the respective channel.

The network element leaving the group can not gain access to the new group key $GK_{neu}$, since it is not capable of deriving the secret channels without knowledge of the bilateral secrets $g^{r_ir_1}$, $g^{r_ir_2}$, ... $g^{r_ir_n}$ between the token holder and the other members of the group of network elements. Upon obtaining the message $M_{L1}$, the remaining group members can decrypt this as described above for message $M_{j5}$.

In the method proposed herein, the position of the virtual token is known at all times. Changes in the position due to a change of the group composition can also be accurately determined. As a special case, the failure of a network element, including that of the token holder must now be considered. This change in the group composition is not signaled to the security layer by the group management but rather by the group management protocol, which identifies the failure. With regard to the process sequence, the failure of a network element corresponds to the exit of a group member. Subsequent to the notification of the failure, the group members behave like in the previously described exit ("leave procedure").

Security Analysis

The following text explains how security requirements are met by the described method.

Key authentication: Access to the group key from outside the group of network elements is prevented on the one hand by checking the identity of every new group member prior to its joining. The new network element will only obtain the group key if this check is successful. Conversely, the joining network element checks by way of the signature sent with message $M_{j3}$ that the transferred identities and public DH values can indeed be associated with the group to be joined. The key renewal procedure ensures by means of the use of secret channels, which are derived from the bilateral DH secrets of the authenticated members that the new group key can only be delivered to the current group.

Forward confidentiality: Forward confidentiality is ensured by means of the procedure when a network element leaves the group. A leaving group member is not able to gain access to the new group key, because, due to the lack of knowledge about the bilateral DH secrets and the newly generated random number, he is not able to gain access to the secret channels between token holder and remaining members through, which the new group key is distributed.

Backward confidentiality: Backward confidentiality is achieved by not delivering the old group key to the joining network element with the message $M_{j5}$. The message parts of $M_{j5}$, which can be decrypted with the new key, do not contain the old group key.

Collusion freedom: A secret agreement between participating network elements to disclose the current group key is prevented because each newly generated group key is not related to the preceding group keys, so that the participating network elements are not able to use their old group keys for the purpose of disclosure.

Perfect forward secrecy: Lasting non-disclosure of a completed session is not assured, if a long term credential is compromised or if an active attacker succeeds in uncovering older group keys. The proposed method only provides a long term credential, the private RSA key, which is used during the authentication phase. However, the RSA key pair is never used for the encryption of the group key, so that the owner is not able to gain access to the group key using a compromised RSA key. The second case is only relevant for a meeting comprising several sessions, for, which different session keys are used. Such a meeting consisting of four sessions will be considered here as an example. The group key is renewed for each session. As a result, each session is characterized by its session key and the associated key materials, as indicated in the following table 1.

TABLE 1

| Key materials | Session 1 | Session 2 | Session 3 | Session 4 |
| --- | --- | --- | --- | --- |
| Group key (GK) | $GK_1$ | $GK_2$ | $GK_3$ | $GK_4$ |
| Temporary secret key $K_{ij}$ between $P_i$ and $P_j$ | $K_{ij1}$ | $K_{ij2}$ | $K_{ij3}$ | $K_{ij4}$ |
| Random number ($N_i$) | $N_{i1}$ | $N_{i2}$ | $N_{i3}$ | $N_{i4}$ |
| Shared secret of $P_i$ and $P_j$ | $g^{r_ir_j}$ | $g^{r_ir_j}$ | $g^{r_ir_j}$ | $g^{r_ir_j}$ |
| Secret DH value of Pi | $r_i$ | $r_i$ | $r_i$ | $r_i$ |

All the key materials apart from the shared secrets ($g^{r_ir_j}$) between $P_i$ and the other members $P_j$(j=1, 2 ..., n with j≠i) and their secret DH values are replaced by new values in every session. According to the above Formulas (2) and (3), the up-to-dateness of the temporary secret group key depends decisively on the random number $N_i$. Since every session utilizes a different group key, a different value for $N_i$ is also used for the generation in each case. If we now assume that an attacker successfully breaks into the network element $P_i$ during the session 3 and gains access to the key materials shaded in grey in the above table, he will still not be able to gain access to the keys of previous sessions. For this, he requires the random number $N_2$. However, this is encrypted with the group key $GK_1$ (see messages $M_{j5}$ and $M_{L1}$ above). For the attacker to uncover $GK_2$, he therefore requires $GK_1$. The latter is no longer in the system, though. Similar considerations apply for the uncovering of $GK_1$. The attacker would thus not be capable of cracking completed sessions.

Resistance to known key attacks: Resistance to attacks with known group keys means that an uncovered group key can not be used to compromise the current session key. Once again, two cases have to be distinguished here (A. J. Menezes et al.: Handbook of applied cryptography, CRC Press series on discrete mathematics and its applications, CRC Press, 1997).

The first case considers the passive attacker who records the communication and analyzes it later. It is assumed that the passive attacker knows the preceding keys and the random number N for the generation of the temporary secret key $K_{ij}$ between two partners. However, this is not sufficient. In order to generate the key, he requires the shared DH secret of the partners. However, this is never transferred via the connection. The other case concerns the active attacker, who attempts to change the data on the connection. Here, we consider the situation that the token holder $P_i$ renews the group key by sending out the messages $M_{j5}$ or $M_{L1}$. Moreover, we assume that the active attacker has somehow gained access to the old group key $GK_{alt}$, thus enabling him to intercept $M_{j5}$ or $M_{L1}$ and enabling him to change the message with the help of $GK_{alt}$ in the following manner:

| $P_i$ token holder | Active attacker | Receiver $P_1$ |
|---|---|---|
| HDR, $GK_{alt}\{ID_i, N_i\}$, $K_{i1}\{FK, GK_{neu}\}$ ... | → HDR, $GK_{alt}\{ID_i', N_i'\}$, $K_{i1}\{FK, GK_{neu}\}$ ... | → HDR, $GK_{alt}\{ID_i', N_i'\}$, $K_{i1}\{FK, GK_{neu}\}$ ... |

The attacker replaces $ID_i$ and $N_i$ with another identity $ID_i'$ and random number $N_i'$. The falsified message would, however, lead to the generation of other temporary secret keys $K_{ij}$ on the side of the receivers, which is, however, uncovered by the authentication of the message part $\{VK, GK_{neu}\}$ by means of the incorrect key $K_{ij}$. Thus, if an attacker falsifies parts of the message with an older key, the group members detect the attack.

In order to rate the performance of the proposed method, it is compared in the following text with the key distribution protocol proposed by Rodeh et al. (cf. O. Rodeh et al.: Optimized Group Rekey for Group Communication Systems. In Symposium Network and Distributed System Security (NDSS), San Diego, Calif., February 2000, S. 39-48) and with the most efficient key agreement protocol TKDH (cf. Y. Kim et al.: Simple and fault-tolerant key agreement for dynamic collaborative groups, in S. Jajodia (ed.): 7th ACM Conference on Computer and Communications Security, Athens, Greece, November 2000, ACM Press, S. 235-244). A benchmark for cryptographic algorithms is used for the comparison (cf. Crypto++ 5.2.1 Benchmarks http://www.eskimo.com/~weidai/benchmarks.html). The comparison is subdivided in the authentication part and the key renewal part.

An authentication is only included in the method proposed herein, but not in the two protocols being compared, which is why only the expenditure for VTKD can be provided here.

The expenditure for the authentication results from the computation costs for the four messages $M_{j1}$~$M_{j4}$ and the additional computation of the bilateral DH secrets. According to the IKEv2 standard, the computation costs include the expenditure for the computation of two RSA signatures, the verification of two signatures, four symmetric cryptographic operations and four hash images. The additional expenditure for the computation of the n DH secrets has a considerably greater impact. For groups of up to 100 participants, such as is intended for VTKD, a computation time of 386 ms is obtained with the benchmark, which would be acceptable. But, strictly speaking, this computation can be carried out "offline", since the DH secrets are not required during the authentication phase, but rather until the key renewal for the secret channels.

An accepted criterion for assessing the efficiency of key exchange protocols is the time between triggering a key renewal and the availability of the new key to all the members. This delay is determined mainly by the communication and computational expenditure. These two aspects are considered hereinafter for the protocols to be compared.

The communication expenditure is related to the number of communication rounds and the size of the messages. They are summarized in table 1 for the three protocols. The communication expenditure is small for VTKD and TGHD, since for joining and leaving only one multicast message is sent out in each case. Rodeh's protocol requires several communication rounds for leaving the group. The Rodeh protocol has an advantage with regard to the message size. It only sends out small messages, while the message size for VTKD for 100 members is of 4 Kbyte and for TGDK even 25 Kbyte. This is, however, not too large a problem, since 25 Kbyte can be accommodated in a UDP packet without any problems.

TABLE 2

| | | Communication expenditure | | | | |
|---|---|---|---|---|---|---|
| Protocol | Operation | Communication rounds | Multicast | Size of the multicast message | Unicast | Size of the unicast message |
| Rodeh et al. | Join | 2 | 2 | $\log_2 n$[1] symmetric keys[2] | 1 | 1 symmetric key |
| | Leave | $\log_2 n$ | $\log_2 n$ | $\log_2 n$ symmetric keys | $\log_2 n$ | 1 symmetric key |
| TGDH | Join[4] | 1 | 1 | 2n asymmetric keys[3] | 1 | 1 symmetric key |
| | Leave | 1 | 1 | $\log_2 n$ asymmetric keys | — | — |
| VTKD | Join | 1 | 1 | n symmetric keys +1 asymmetric keys | — | — |
| | Leave | 1 | 1 | n symmetric keys | — | — |

Legend:
[1] n is the number of group members.
[2] The typical size of a symmetric key is 128 bit = 16 bytes.
[3] The typical size of an asymmetric key is 1024 bit = 128 bytes.
[4] The entry into TGDH requires two communication rounds, but only one communication round is used for key renewal.

Table 3 shows the computational expenditure of the protocols by indicating the different cryptographic operations they use. The comparison shows that the protocols employ symmetric and asymmetric operations in different ways. While, on the one hand, TGDH intensively carries out asymmetric computations, the method proposed herein primarily makes use of symmetric operations. Rodeh's protocol lies in between. Because asymmetric cryptographic computations are considerably slower than symmetric ones, as is generally known, the overall computational expenditure of VTKD is smaller than that of the other protocols.

TABLE 3

| Protocol | Operation | Members | DH secrets[4] | RSA signature[5] | RSA verification[5] | Hash and symmetric encryption | Hash and symmetric decryption |
|---|---|---|---|---|---|---|---|
| Rodeh | Join | Tree leader | 1 | — | — | 2 | — |
| | | New member | 1 | — | — | — | 1 |
| | | Participants | — | — | — | — | 1 |
| | Leave | Tree leader | $\log_2 n$[1] | — | — | $\log_2 n$ | — |
| | | Subtree leader | 1 | — | — | — | 1 |
| | | Participants | — | — | — | — | 1 |
| TGDH[2] | Join | Sponsor | $2\log_2 n$ | 1 | — | — | — |
| | | New member | $2\log_2 n$ | — | 1 | — | — |
| | | Participants | $1 \ldots 2\log_2 n$ | — | 1 | — | — |
| | Leave | Sponsor | $2\log_2 n$ | 1 | — | — | — |
| | | Participants | $1 \ldots 2\log_2 n$ | — | 1 | — | — |
| VTKD[3] | Join | Token owner | — | — | — | n + 3 | — |
| | | New member | — | — | — | — | 2 |
| | | Participants | 1 | — | — | — | 3 |
| | Leave | Token owner | — | — | — | n + 2 | — |
| | | Participants | — | — | — | — | 2 |

Legend:
[1] n is the number of group members.
[2] The best case of a balanced key tree is considered for TGDH. The worst case requires n DH secret considerations.
[3] The computational expenditure for the group key renewal is represented here, for, which the generation of the messages $M_{j5}$ and $ML_1$ takes place in VTKD.
[4] A DH secret consideration means an exponential computation.
[5] RSA signature in TGDH is utilized for message authentication.

With the tables 2 and 3 it is now possible to determine the key renewal delay $D_{gkr}$ as follows:

$$D_{gkr} = D_{cs} + D_{gc} + D_{cr} \quad (4)$$

where $D_{cs}$ and $D_{cr}$ denote the cryptographic computation delay of the sender and receiver, respectively, and Dgc denotes the communication delay.

For the comparison it is further assumed that all the protocols run via the same group communication protocol, which generates a delay of 20 ms for each communication round. This is a typical delay in medium size networks, such as G-WiN, in which we have measured a maximum cycle time of 40 ms to arbitrary nodes. The computation delay for the sender and receiver was again determined by using the cryptographic benchmark Crypto++ 5.2.1 Benchmarks http://www.eskimo.com/~weidai/benchmarks.html.

Figure 5:
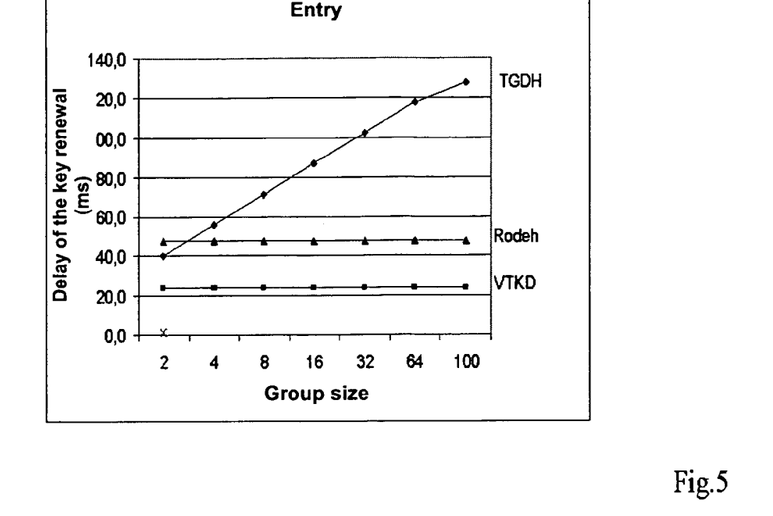
FIG. 5 is a graphical representation to compare the delay during the key renewal as a function of the size of the group of network elements for different methods.
Figure 6:
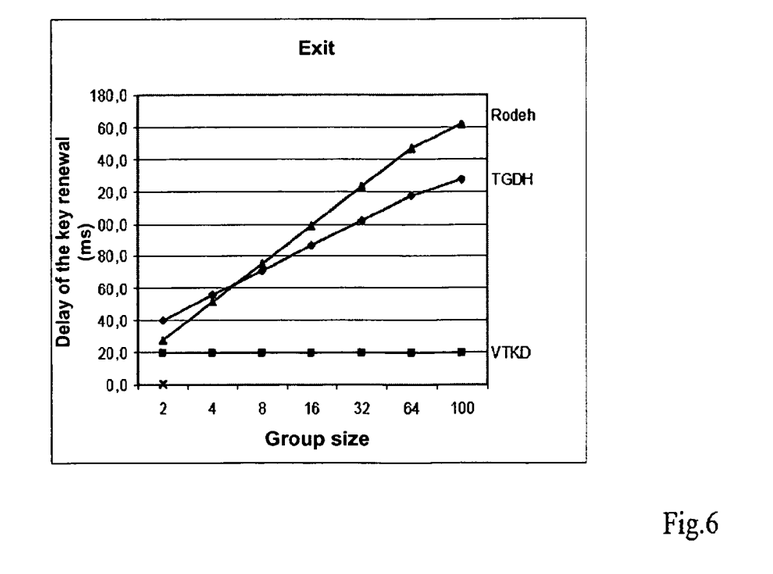
FIG. 6 is a graphical representation to compare the delay during the key renewal for different methods when a network element leaves the group of network elements.

The overall resulting delays for the key renewal for the join into the group and the leave are shown in FIG. 5. VTKD is more efficient than the other two protocols. The reason for this is that VTKD requires fewer communication rounds than the other two and predominantly uses symmetric encryption operations.

The efficient and secure key renewal forms a basis for confidential communication in small dynamic groups. Such application cases are found particularly in the business area, where negotiations and briefings are increasingly also carried out over the Internet. Viable approaches are available for centralized approaches with a group server. With increasing use of mobile communication, there is a growing need for solutions, which dispense with a group server and support peer-to-peer communication of the partners. Especially ad hoc meetings are thereby supported as well. The methods applied must be efficient, since, apart from the key distribution and audio/video encryption, other time and resource intensive processes run on the end systems with the compression and decompression of the media data. For such applications, the scaling of the protocol is less the problem than the efficiency and security of the method.

The characteristics of the invention disclosed in the above description, in the claims and in the drawing may be relevant for the realization of the invention in its various embodiments, taken individually or in arbitrary combinations thereof.

The invention claimed is:

1. Method for renewing a group key GK for a secure data exchange in a group of network elements $P_1 \ldots P_n$ (n=2, 3, . . .) in a network system having a closed peer-to-peer configuration and a virtual synchrony supporting group communication protocol in a communication layer of a system architecture of the network system,
   wherein said method for group key renewal, when a composition of the group of network elements $P_1 \ldots P_n$ is changed by the joining of a new network element $P_{n+1}$ into the group of network elements $P_1 \ldots P_n$ or by the leaving of a network element $P_v$ ($1 \leq v \leq n$) from the group of network elements $P_1 \ldots P_n$, comprises the steps of:
   selecting a network element $P_i^*$ ($1 \leq i \leq n$) from the group of network elements $P_1 \ldots P_n$,
   generating a new group key $GK_{neu}$ by $P_i^*$ and transferring the new group key $GK_{neu}$ by $P_i^*$ to all the remaining network elements $P_k (1 \leq k \leq n, k \neq i)$ of the group of network elements $P_1 \ldots P_n$ in the changed composition, by performing a key exchange with all the remaining network elements $P_k$ in accordance with the Diffie-Hellman principle;

wherein a processor implements said steps of selecting, generating and transferring.

2. The method according to claim 1,
wherein said step of selecting includes:
assigning a virtual token, by means of a token protocol, to a network element $P_i$ ($1 \leq i \leq n$) from the group of network elements $P_1 \ldots P_n$, with the network element $P_i$ thus becoming a token holder PT, in order to determine the selected network element $P_i^*$ during the group key renewal.

3. The method according to claim 1,
wherein said step of selecting includes:
assigning a physical token, by means of a token protocol, to a network element $P_i$ ($1 \leq i \leq n$) from the group of network elements $P_1 \ldots P_n$, with the network element $P_i$ thus becoming a token holder PT, in order to determine the selected network element $P_i^*$ during the group key renewal.

4. The method according to claim 2,
further comprising the step of:
carrying out the token assignment for further group key renewals by reassigning the token for each group key renewal, by the processor.

5. The method according to claim 2,
wherein said step of selecting includes:
determining the token holder PT from a group of network elements $P_1 \ldots P_n$ according to the following relation PT=VK mod n, where VK indicates a numerical value for a version number of the new group key $GK_{neu}$ generated during the group key renewal and is increased by the value of 1 in each group key renewal.

6. The method according to claim 1,
wherein said step of generating includes:
renewing the group key using the modified IKEv2 protocol.

7. The method according to claim 6,
wherein said step of transferring includes:
transferring the new group key $GK_{neu}$ according to the Diffie-Hellman principle when the new network element $P_{n+1}$ joins the group of network elements $P_1 \ldots P_n$, by means of a message having the following structure:

$M_{j5}(P_i \rightarrow P_1, P_2 \ldots P_{n+1})$:HDR, $GK_{alt}\{ID_i, N_i\}$, $K_{i1}\{VK_{alt}, GK_{neu}\}, \ldots, K_{in}\{VK_{alt}, GK_{neu}\}$, SK $\{GK_{neu}, VK_{neu}, GSA, ID_i\}$, $GK_{neu}\{g^{m+1}, ID_{n+1}\}$ wherein a first message part $GK_{alt}\{ID_i, N_i\}$, which is encrypted with an old group key $GK_{alt}$ used prior to the new group key, comprises an identity $ID_i$ of the token holder PT and a random number N;

wherein a second message part $K_{i1}\{VK_{alt}, GK_{neu}\}, \ldots, K_{in}\{VK_{alt}, GK_{neu}\}$ comprises the new group key $GK_{neu}$ and a numerical value for the version number $VK_{alt}$ of the old group key $GK_{alt}$;

wherein a third message part SK $\{GK_{neu}, VK_{neu}, GSA, ID_i\}$, which is encrypted with a session key SK, transfers the new group key $GK_{neu}$, a numerical value for the version number $VK_{neu}$ of the new group key $GK_{neu}$, a security association GSA of the group of network elements $P_1 \ldots P_n$ and the identity $ID_i$ of the token holder PT to the new network element $P_{n+1}$ joining the group of network elements $P_1 \ldots P_n$; and wherein a fourth message part $GK_{neu}\{g^{m+1}, ID_{n+1}\}$, which is encrypted with the new group key $GK_{neu}$, comprises an identity $ID_{n+i}$ and a public Diffie-Hellman value $g^{m+1}$ of the new network element $P_{n+1}$ joining the group of network elements $P_1 \ldots P_n$.

8. The method according to claim 1,
further comprising the step of authenticating the new network element $P_{n+1}$ before the group key renewal, when the new network element $P_{n+1}$ joins the group of network elements $P_1 \ldots P_n$, by the processor.

9. The method according to claim 8, wherein said step of authenticating includes:
carrying out the authentication of the new network element $P_{n+1}$ by the selected network element $P_i^*$.

10. The method according to claim 8,
wherein said step of authenticating includes:
carrying out the authentication of the new network element $P_{n+1}$ by means of a digital signature.

11. The method according to claim 8,
wherein said step of transferring includes:
transferring a respective public Diffie-Hellman value $g^i$ ($1 \leq i \leq n$) to the new network element $P_{n+1}$ for all the remaining network elements $P_k$ of the group of network elements $P_1 \ldots P_n$, by the selected network element $P_i^*$, and transferring a public Diffie-Hellman value $g^{n+1}$ to the selected network element $P_i^*$, by the new network element $P_{n+1}$, and transferring the public Diffie-Hellman value $g^{n+1}$ of the new network element $P_{n+1}$ to all the remaining network elements $P_k$ of the group of network elements $P_1 \ldots P_n$, by the selected network element $P_i^*$, when the new network element $P_{n+1}$ is successfully authenticated.

12. The method according to claim 8,
wherein said step of authenticating includes:
carrying out the authentication of the new network element $P_{n+1}$ by means of the IKEv2 protocol.

13. The method according to claim 8, wherein said step of authenticating includes:
exchanging the following messages between the new network element $P_{n+1}$ and the selected network element $P_i^*$ during the authentication of the new network element $P_{n+1}$:

$M_{J1}(P_i \rightarrow P_{n+1})$:HDR, $a^{ri}$, $SA_i$, $NA_i$ $M_{J2}(P_{n+i} \rightarrow P_i)$:HDR, $a^{rn+1}$, $SA_{n+1}$, $NA_{n+1}$ $M_{J3}(P_i \rightarrow P_{n+1})$:HDR, SK $\{ID_i, CERT_i, SIG_i, ID_1, ID_2 \ldots ID_n, g^{r1}, g^{r2} \ldots g^{rn}\}$ $M_{J4}(P_{n+1} \rightarrow P_i)$:HDR, SK $\{ID_{n+1}, CERT_{n+1}, SIG_{n+1}, g^{rn+1}\}$ where HDR are head data, CERT is a certificate of a public RSA key, SIG is the digital signature, $g^r$ is a public Diffie-Hellman value for generating a temporary secure transfer channel K and $a^r$ is a public value for generating a session key SK;

where SK$\{M\}$ indicates an encryption of the message M using an encryption key $SK_e$ and an authentication using an authentication key $SK_a$; and where a security association SA is negotiated with the messages $M_{J1}$ and $M_{J2}$.

14. The method according to claim 1,
further comprising the step of:
carrying out the group key renewal, when a network element $P_v$ leaves, analogously to the joining of the new network element $P_{n+1}$, by the processor.

15. The method according to claim 14,
further comprising the step of:
deleting a public Diffie-Hellman value $g^v$ of the network element $P_v$, by all the remaining network elements $P_x$ ($1 \leq x \leq n$, $x \neq v$) of the group of network elements $P_1 \ldots P_n$ in the changed composition, when the network element $P_v$ leaves the group of network elements $P_1 \ldots P_n$, by the processor.

16. The method according to claim 1,
further comprising the step of:
using the new group key $GK_{neu}$ in data communication between the several network elements $P_i$ in the network system for exchanging video and/or audio and/or text data, by the processor.

* * * * *

UNITED STATES PATENT AND TRADEMARK OFFICE
CERTIFICATE OF CORRECTION

| | |
|---|---|
| PATENT NO. | : 7,957,320 B2 |
| APPLICATION NO. | : 11/522520 |
| DATED | : June 7, 2011 |
| INVENTOR(S) | : Hartmut König et al. |

It is certified that error appears in the above-identified patent and that said Letters Patent is hereby corrected as shown below:

On title page, Item (73) Assignee

"Brandenburgishe Technishe Universitat Cottbus" should be
-- Brandenburgische Technische Universität Cottbus -- on the first page of the patent.

Signed and Sealed this
Twenty-eighth Day of August, 2012

David J. Kappos
*Director of the United States Patent and Trademark Office*